Patented Nov. 6, 1945

2,388,657

UNITED STATES PATENT OFFICE 2,388,657

PREPARATION OF ACID CHLORIDES

John R. Long, Stow, Ohio, assignor to Wingfoot Corporation, Akron, Ohio, a corporation of Delaware No Drawing. Application April 15, 1943,
Serial No. 483,179

10 Claims. (Cl. 260—544)

This invention relates to a method for the preparation of unsaturated acid halides from the corresponding halogenated acid halides. More particularly, the invention encompasses a method of readily removing a molecule of hydrogen halide from a haloacid chloride to produce an unsaturated compound.

It has been discovered as a result of experimentation that tertiary amines and tertiary amine salts, may be employed in catalytic amounts to remove readily a molecule of hydrogen halide, e. g., hydrogen chloride or hydrogen bromide, from a beta haloacid halide. Suitable starting materials are embraced by the general formula

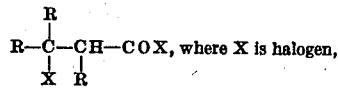

specifically chlorine or bromine, and R is hydrogen, halogen, alkyl, or other organic radical, and each R may denote the same or different radicals within the same compound. Specifically, it may be said that suitable raw materials are the beta, haloacid chlorides and bromides, in which there is at least one hydrogen atom on the alpha carbon and at least one halogen on the beta carbon. The product is in every case an alpha, beta unsaturated acid halide, especially, an aliphatic acid chloride, although these may carry an aromatic substituent. Additional halogen may be present in the compound, only one halogen atom being removed by the method.

The method is carried out by heating the haloacid halide in the presence of the tertiary amine or tertiary amine salt until an amount of hydrogen halide is split off and removed corresponding to one mol of the hydrogen halide, i. e. the theory calls for the removal of one mol of the hydrogen halide for each mol of the haloacid halide. The halide of the amine used is formed in the reaction after a small amout of hydrogen halide is split out and it is probable that this salt is the actual catalyst. In any event, the amine and its salts may be viewed as equivalents for the purposes of the invention.

The process is illustrated by the following examples, but it will be understood that no limitation is intended thereby.

Example 1

A mixture of 1,002 grams of alpha, beta dichlorbutyryl chloride and 10 grams of triamylamine was heated to a temperature of 125-135° C. in a flask attached to a reflux condenser until there was observed the theoretical weight loss of hydrogen chloride, i. e., one mol of hydrogen chloride per mol of acid chloride. The reaction mixture was then distilled under reduced pressure, say 10 to 60 mm. Hg, to give a 93% yield of alpha chlorcrotonyl chloride.

Example 2

In a second experiment, alpha, beta dichlorbutyryl chloride in the amount of 1,811 grams was placed with 18 grams of triethylamine in a flask attached to a reflux condenser. The mixture was heated at a temperature of 120-135° C. until the evolution of hydrogen chloride had practically ceased. The reaction mixture was then distilled at reduced pressure to give a 94% yield of the alpha chlorcrotonyl chloride.

Example 3

A mixture of 219 grams of beta chlorpropionyl chloride and 2.2 grams of triamylamine was heated in a flask attached to a 1.8 x 20 cm. column so that the temperature of the vapors at the top of the column, as they entered the condenser, was 70° C. or less. The condensate was redistilled through the packed column to give 120 grams of acrylyl chloride having a boiling point of 72-73° C.

It will be noted in the foregoing examples that the amount of tertiary amine employed is quite small compared with the quantity of raw material treated. The catalyst is, in fact, used in catalytic amount, as distinguished from the use of the amine in an amount which is molecularly equivalent to the hydrogen halide to be removed. It will thus be apparent that the amine acts as a catalyst, as stated, and not by permanent combination with the hydrogen halide. In general, the amount of amine employed will be less than 5%, and preferably from 1% to 2%, on the weight of the raw material to be treated.

The reaction may be carried out at any suitable temperature and will be continued until approximately one mol of hydrogen halide has been removed for each mol of the haloacid chloride being treated. This point can be determined by weighing the contents of the reactor or by other feasible means. While, as stated, various suitable temperatures may be employed, it is found that usually a temperature between about 80° C. and 140° C. is satisfactory.

The method may be applied to the treatment of beta chloracid chlorides as a class, among them being the following: Beta chlorpropionyl chloride; alpha, beta dichlorpropionyl chloride; beta chlor isobutyryl chloride; beta chlorbutyryl chloride; alpha, beta dichlorbutyryl chloride; alpha phenyl beta chlor propionyl chloride; beta phenyl beta chlor propionyl chloride; beta, beta dichlorpropionyl chloride; beta, beta, beta tri-chlorpropionyl chloride; alpha, beta beta trichlorpropionyl chloride.

These starting materials when treated in accordance with the method of the invention give in order the following products by removal of one mol of hydrogen chloride: Acrylyl chloride; alpha chloracrylyl chloride; methacrylyl chloride; crotonyl chloride; alpha chlorcrotonyl chloride; alpha phenyl acrlyl chloride; cinnamyl chloride; beta chloracrylyl chloride; beta, beta dichloracrylyl chloride; alpha, beta dichloracrylyl chloride.

Other alpha, beta unsaturated acid chlorides may be similarly prepared from other chloracid chlorides. In addition, the acid bromides corresponding to the above may be prepared in like manner and the starting materials may be chlorinated or brominated so that either hydrogen chloride or hydrogen bromide is removed to give the desired unsaturated acid chloride or acid bromide.

Among the tertiary amines which may be used in catalytic amount to catalyze the reaction, the trialkyl amines are preferred but any of the following may be used: Triethylamine, tripropylamine, tributylamine, triamylamine, dimethyl ethylamine, diethyl propylamine, diamyl methylamine, dibutyl amylamine, diethyl hexylamine, dimethylaniline.

While there have been described above certain preferred embodiments of the invention, it will be apparent to those skilled in the art that various modifications and changes may be made therein without departing from the spirit of the invention or from the scope of the appended claims.

I claim:

1. A method of preparing alpha, beta unsaturated acid halides which comprises heating the corresponding halogenated acid halide from the group consisting of chlorinated acid halides and brominated acid halides with a catalytic amount of a catalyst from the group consisting of tertiary amines and the salts thereof, removing the liberated hydrogen halide from the reaction mass and then separating the unsaturated acid halide from the reaction mass.

2. A method of preparing alpha, beta unsaturated acid halides of the group consisting of acid chlorides and acid bromides which comprises heating the corresponding halogenated acid halide from the group consisting of chlorinated acid halides and brominated acid halides with from 1 to 5% of a catalyst from the group consisting of tertiary amines and the salts thereof, removing the liberated hydrogen halide from the reaction mass and then separating the unsaturated acid halide from the reaction mass.

3. A method of preparing alpha, beta unsaturated acid halides of the group consisting of acid chlorides and acid bromides which comprises heating the corresponding halogenated acid halide from the group consisting of chlorinated acid halides and brominated acid halides with a catalytic amount of a catalyst from the group consisting of tertiary amines and the salts thereof, removing hydrogen halide from the reaction mass until its evolution has substantially ceased and then separating the unsaturated acid halide from the reaction mass.

4. A method of preparing alpha, beta unsaturated acid halides of the group consisting of acid chlorides and acid bromides which comprises heating the corresponding halogenated acid halide from the group consisting of chlorinated acid halides and brominated acid halides with from 1 to 5% of a catalyst from the group consisting of tertiary amines and the salts thereof, removing hydrogen halide from the reaction mass until the weight loss equals one mol and then separating the unsaturated acid halide from the reaction mass.

5. A method of preparing alpha, beta unsaturated acid halides of the group consisting of acid chlorides and acid bromides which comprises heating at a temperature between about 80° and 140° C., the corresponding halogenated acid halide from the group consisting of chlorinated acid halides and brominated acid halides with from 1 to 5% of a catalyst from the group consisting of tertiary amines and the salts thereof, removing hydrogen halide from the reaction mass until the weight loss equals one mol and then separating the unsaturated acid halide from the reaction mass.

6. A method of preparing alpha, beta unsaturated acid halides of the group consisting of acid chlorides and bromides which comprises heating the corresponding chloracid halide with a catalytic amount of a catalyst from the group consisting of tertiary amines and the salts thereof, removing approximately one mol of hydrogen chloride from the reaction mass and then separating the unsaturated acid halide from the reaction mass.

7. A method of preparing alpha, beta unsaturated acid chlorides which comprises heating at a temperature between about 80° and 140° C. the corresponding chloracid chloride with from 1 to 5% of a catalyst from the group consisting of tertiary amines and the salts thereof removing approximately one mol of hydrogen chloride from the reaction mass and then separating the unsaturated acid chloride from the reaction mass.

8. A method of preparing alpha chlorcrotonyl chloride which comprises heating alpha, beta dichlorbutyryl chloride in the presence of a catalytic amount of a catalyst from the group consisting of tertiary amines and the salts thereof, removing approximately one mol of hydrogen chloride from the reaction mass and then separating the alpha chlorcrotonyl chloride from the reaction mass.

9. A method of preparing acrylyl chloride which comprises heating beta chlorpropionyl chloride in the presence of from 1 to 5% of a catalyst from the group consisting of tertiary amines and the salts thereof, removing approximately one mol of hydrogen chloride from the reaction mass and then separating the acrylyl chloride from the reaction mass.

10. A method of preparing alpha chlorcrotonyl chloride which comprises heating alpha, beta dichlorbutyryl chloride at a temperature between about 80° and 140° C. in the presence of not over 5% of a tertiary amine, removing approximately one mol of hydrogen chloride from the reaction mass and then distilling the reaction mass to separate the alpha chlorcrotonyl chloride.

JOHN R. LONG.